United States Patent [19]

Nahm et al.

[11] 3,721,703

[45] March 20, 1973

[54] PHENOXYALKANE-CARBOXYLIC ACIDS, SALTS AND ESTERS THEREOF

[75] Inventors: Helmut Nahm, Frankfurt am Main, Germany; by Helene Elise Siedel, heiress, late of Bad Soden/Taunus, Germany by Helene Elise Siedel, Heiress

[73] Assignee: Farbwerke Hoechst Aktiengesellschaft vormals Meister, Lucius & Bruning, Frankfurt am Main, Germany

[22] Filed: Jan. 9, 1969

[21] Appl. No.: 790,897

[30] Foreign Application Priority Data

Jan. 11, 1968 Germany.....................P 16 68 896.3

[52] U.S. Cl.........260/471 R, 260/473 G, 260/501.1, 260/501.11, 260/501.16, 260/501.17, 260/519, 260/520, 424/308, 424/309, 424/316, 424/317, 424/319

[51] Int. Cl..............................................C07c 101/44
[58] Field of Search.........260/471 R, 473 A, 473 G, 260/501.11, 520, 519, 501.1, 501.16, 501.17

[56] References Cited

UNITED STATES PATENTS 3,493,604  2/1970  Nelson et al...........................260/520
3,549,690  12/1970  Leigh et al.............................260/520

*Primary Examiner*—Lorraine A. Weinberger
*Assistant Examiner*—L. Arnold Thaxton
*Attorney*—Curtis, Morris & Safford

[57] ABSTRACT

Phenoxyalkane-carboxylic acids with a 4-substituted phenoxy group in para position of the benzene ring, their esters with aliphatic, cycloaliphatic or araliphatic alcohols and their salts with non-toxic bases having a decreasing effect on the serum cholesterol level and a process for their manufacture.

12 Claims, No Drawings

PHENOXYALKANE-CARBOXYLIC ACIDS, SALTS AND ESTERS THEREOF

The present invention relates to phenoxyalkane-carboxylic acids of the general formula I

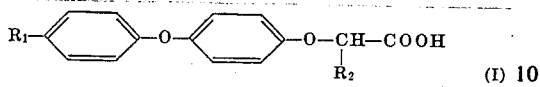

in which $R_1$ is nitro, amino, acylamino, lower alkoxy or halogen, $R_2$ is hydrogen or lower alkyl, and esters thereof with aliphatic, cycloaliphatic or araliphatic alcohols or salts with non-toxic bases.

The invention relates, moreover, to a process for the manufacture of said compounds, which comprises a. reacting phenols of the general formula II

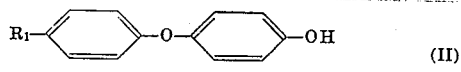

in which $R_1$ has the meaning given above, with α-halogeno-fatty acids of the general formula III

in which $R_2$ has the meaning given above and Hal stands for a halogen atom, or salts or esters thereof with lower alcohols in the presence of agents splitting off hydrogen halide and, if desired, hydrolyzing the phenoxyalkanecarboxylic esters with alkaline agents or esterifying the phenoxyalkane-carboxylic acids with aliphatic, cycloaliphatic or araliphatic alcohols. In the alternative, the compounds can be made by b. reducing carboxylic acids of the general formula I in which $R_1$ stands for a nitro group, or esters or salts thereof and, if desired to obtain an acylamino group, in the 4-amino-phenoxycarboxylic acids or derivatives thereof thus obtained, acylating the amino group by a treatment with acylating agents and, if desired prior to or after the acylation, hydrolyzing a carboxylic ester group with alkaline agents or esterifying a carboxylic acid with aliphatic, cycloaliphatic or araliphatic alcohols. Still another method for making the compounds involves c. transesterifying esters of the general formula IV

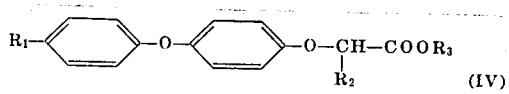

in which $R_1$ and $R_2$ have the meaning given above and $R_3$ is lower alkyl, by reacting them with aliphatic, cycloaliphatic or araliphatic alcohols having an elevated boiling point.

The para-substituted phenoxyphenols of the formula II used as starting substances may be prepared from 4-nitro-4'-methoxydiphenyl ether by the methods indicated in J.Am. Chem. Soc. 61, pages 2702–2704 (1939) or in Chem. Abstr. 54, column 10, 922 h (1960). In modification of those methods, this compound may also be prepared from nitrofluorobenzene and 4-hydroxy-anisol. For this purpose, the solution of the two components is refluxed in dimethylformamide in the presence of alkali metal carbonate.

The 4-nitro-4'-methoxy-diphenyl ether thus obtained with an excellent yield is then dealkylated by means of hydrohalic acid in glacial acetic acid to yield 4-(4'-nitrophenoxy)-phenol.

The reduction of this nitro compound by catalytic hydrogenation provides 4-(4'-aminophenoxy)-phenol. This compound may be used as starting material for the process of the invention — the reaction with compounds of formula III according to method a) —. It is also suitable as starting substance for preparing 4-(4'-halophenoxy)-phenols from the corresponding diazonium salts by the method of Sandmeyer. In this manner, the 4-(4'-halophenoxy)-phenols in which the halogen atom may be fluorine, chlorine, bromine or iodine, may be prepared. It is, however, suitable to prepare 4-(4'-fluorophenoxy)-phenol by heating the diazonium-fluoborate compound of the formula:

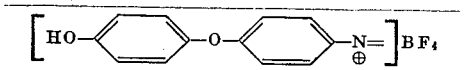

The preparation of further phenols used as starting substances is disclosed following the Examples.

The reaction of the phenoxyphenols thus prepared with α-halogeno-fatty acids or their derivatives of the general formula III according to method (a) is carried out in a manner known per se, advantageously in an organic solvent. Preferred halogeno-fatty acids are halogeno-acetic acid, α-halogeno-propionic acid and α-halogen-butyric acid.

It is advantageous to use as solvents ketones such as acetone or methylketone; carboxylic acid amides such as dimethylformamide, or aromatic hydrocarbons such as benzene or toluene. The reaction is carried out in the presence of an inorganic base in order to bind the hydrohalic acid set free, for example potassium carbonate, or of a tertiary organic base, for example triethylamine. When the reaction is complete, the salt of the hydrohalic acid is separated by suction-filtration and, after the organic solvent has been eliminated, the ester or salt of the carboxylic acid obtained is isolated. The ester may be purified by distillation, the salts are suitably purified by recrystallization from water or solvents containing water.

In case a carboxylic ester thus obtained is to be converted into the carboxylic acid, hydrolysis is effected by means of alkaline agents, advantageously using aqueous alkaline solutions in the presence of lower alcohols and refluxing for a considerable time. The alkaline solution is finally acidified, whereupon the free acids precipitate in crystalline or oily form.

In case free halogeno-carboxylic acids of the formula III are reacted with the phenoxyphenols, the carboxyl group may subsequently be esterified in usual manner, most advantageously in the presence of catalytic amounts of acid, such as sulfuric acid, toluene-sulfonic acid or hydrochloric acid. As alcohols suitable for the esterification, for example, aliphatic straight-chain or branched alcohols having up to 10 carbon atoms, cycloaliphatic alcohols, especially cyclohexanol and cyclopentanol, araliphatic alcohols such as benzylalcohol or phenylethyl alcohol in which the phenyl ring may be substituted by alkoxy groups, or alcohols of the terpene group such as borneol, fenchol or terpineol may be mentioned.

For the esterification the acid chlorides of the carboxylic acids of formula I, which can easily be obtained, for example by a reaction with thionyl chloride, may also be reacted with the specified alcohols to yield the corresponding esters.

The compounds of the general formula I in which $R_1$ is amino or acylamino are preferably prepared by reducing the corresponding p-nitrophenoxy-phenoxy-carboxylic esters or the free acids or salts thereof. The reduction of the nitro group is effected by usual methods, for example in the presence of Raney-nickel as a catalyst. The acylamino compounds may be prepared by acetylating, in usual manner, the aminocarboxylic esters thus obtained by means of acylating agents such as acid chlorides or acid anhydrides.

According to method (c), esters are obtained by transesterifying lower alkyl esters, advantageously in an excess of an alcohol having an elevated boiling point, and continuously distilling off the lower alcohol set free. For this purpose, the above-specified alcohols may be used provided that their boiling points are higher than those of the lower aliphatic alcohols of the phenoxyalkane-carboxylic esters.

The 4-phenoxy-phenoxyalkane-carboxylic acids may be used as medicaments in the form of the free acids or in the form of esters or salts thereof with non-toxic bases. As such they have a very strong action on fat and cholesterol metabolism.

As esters especially the esters with aliphatic lower alcohols having one to four carbon atoms may be mentioned, preferably ethyl ester and butyl ester.

For the formation of salts of the free carboxylic acids, non-toxic inorganic or organic bases are used. Such salts include, for example, sodium salts, potassium salts or calcium salts, or salts of organic bases such as benzylamine, phenylethylamine, cinnamylamine, in which the phenyl ring may also be substituted, for example by alkoxy groups. Aliphatic amines, for example lower alkylamines or ethanolamine, may also be used for salt formation.

In order to determine in vivo the decrease of the serum cholesterol level, the substance was orally administered to rats and the results were determined by the method of Chappel et al. described in Nature, vol. 201 (1964) p. 497/498. The products of the invention were compared with known substances decreasing cholesterol concentration. For example, it has been verified that the known 4-chlorophenoxy-isobutyric acid ethyl ester (cf. Nature, vol. 208, p. 856) reduces the cholesterol level by 30–40 percent at a dose of 300 mg/kg of rat, and the 3-pyridyl-acetic acid (cf. Arzneimittelforschung vol. 11 (1961), p. 265) decreases the cholesterol level by 39 percent at the same dose of 300 mg/kg of rat.

In contrast thereto, the products of the invention were administered, in all the cases, in at most 1/10 of this dose, i.e., at most 30 mg/kg of rat. The results are indicated in the following Table:

TABLE

| Preparation | Dose administered orally in mg/kg | Decrease of initial value of serum cholesterol level |
|---|---|---|
| 4-(4'-fluorophenoxy)-phenoxy-acetic acid | 30 | 52 |
| 4-(4'-chlorophenoxy)-phenoxy-acetic acid | 30 | 17 |
| 4-(4'-bromophenoxy)-phenoxy-acetic acid | 30 | 21.5 |
| α-4-(4'-fluorophenoxy)-phenoxy-propionic acid | 30 | 35 |
| α-4-(4'-chlorophenoxy)-phenoxy-propionic acid | 30 | 42 |
|  | 10 | 21 |
|  | 3 | 16 |
| α-4-(4'-bromophenoxy)-phenoxy-propionic acid | 30 | 42.5 |
|  | 10 | 22 |
|  | 3 | 20 |
| α-4-(4'-iodophenoxy)-phenoxy-propionic acid | 30 | 31 |
|  | 10 | 30 |
|  | 3 | 31 |
|  | 1 | 29 |
| α-4-(4'-methoxyphenoxy)-phenoxy-butyric acid (benzylamine salt) | 30 | 16 |
| α-4-(4'-chlorophenoxy)-phenoxy-butyric acid (benzylamine salt) | 30 | 30 |
|  | 10 | 8 |
|  | 3 | 8 |
| α-4-(4'-iodophenoxy)-phenoxy-butyric acid | 30 | 40 |

The values shown in the Table demonstrate that the products of the present invention are several fold superior to those compounds known to decrease the cholesterol concentration.

The products of the invention are, predominantly, administered orally, preferably in the form of tablets, capsules or dragees. They are directly filled as active ingredients in capsules or they are processed into tablets, dragees or capsules in admixture or conjunction with the usually carriers such as lactose, starch, tragacanth or magnesium stearate.

The following Examples serve to illustrate the invention but they are not intended to limit it thereto.

EXAMPLE 1

4-(4'-nitrophenoxy)-phenoxy-acetic acid

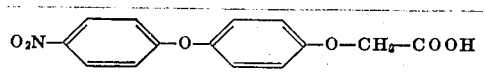

a. 51 g of potassium carbonate are added to a solution of 85 g of 4-(4'-nitrophenoxy)-phenol and 45 g of chloroacetic acid ethyl ester in 1,000 ml of methylethyl-ketone and the mixture is heated at the boil, while stirring, for 8 hours on the steam bath. After inorganic salts have been suction-filtered, the filtrate is evaporated to dryness. The ester formed is taken up in methylene chloride and after having been shaken several times with water it is isolated by evaporating the organic solvent. After recrystallization from ethanol, 95 g of ester melting at 112°C are obtained.

b. 10 g of the ester thus obtained are refluxed for 1 hour on the steam bath with 100 ml of methanol and 10 ml of a sodium hydroxide solution of 45 percent strength. After acidification with concentrated hydrochloric acid the 4-(4'-nitrophenoxy)-phenoxy-acetic acid crystallizes. After recrystallization from methanol, 8 g of the product having a melting point of 169°C are obtained.

The method disclosed in Example 1 (a) serves for preparing the following compounds, wherein equivalent amounts of phenol and halogeno-fatty acid esters are reacted. All melting points are corrected.

c. α-4-(4'-fluorophenoxy)-phenoxy-acetic acid m.p. 152°C

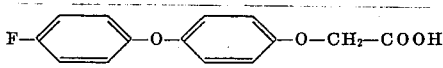

d. α-4-(4'-fluorophenoxy)-phenoxy-propionic acid m.p. 129°C

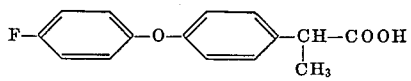

e. α-4-(4'-fluorophenoxy)-phenoxy-butyric acid m.p. 77°C

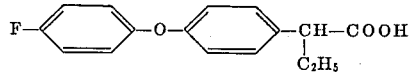

f. 4-(4'-chlorophenoxy)-phenoxy-acetic acid m.p. 166°C

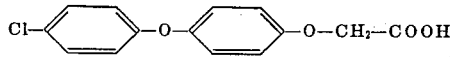

g. α-4-(4'-chlorophenoxy)-phenoxy-propionic acid m.p. 127°C

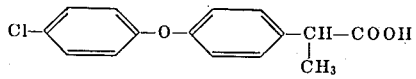

h. α-4-(4'-chlorophenoxy)-phenoxy-butyric acid benzylamine salt m.p. 150°C

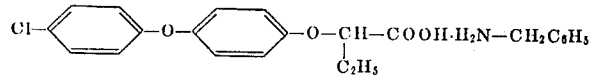

i. 4-(4'-iodophenoxy)-phenoxy-acetic acid m.p. 148°C

k. α-4-(4'-iodophenoxy)-phenoxy-propionic acid m.p. 168°C

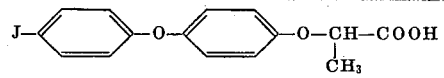

l. α-4-(4'-iodophenoxy)-phenoxy-butyric acid m.p. 101°C

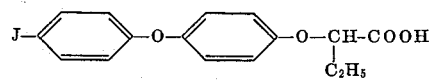

m. α-4-(4'-methoxyphenoxy)-phenoxy-propionic acid m.p. 93°C

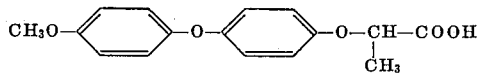

n. α-4-(4'-methoxyphenoxy)-phenoxy-butyric acid m.p. 156°C (oily) benzylamine salt

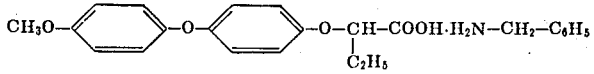

o. 4-(4'-hydroxy)-phenoxy-acetic acid m.p. 152°C

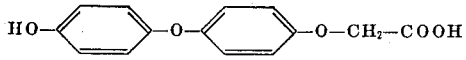

p. 4-(4'-iodophenoxy)-phenoxy-acetic acid ethyl ester m.p. 124°C.

EXAMPLE 2

4-(4'-aminophenoxy)-phenoxy-acetic acid

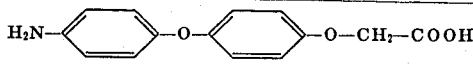

40 g of 4-(4'-nitrophenoxy)-phenoxy-acetic acid ethyl ester prepared according to Example 1 (a) are suspended in a shaking device containing 1,200 ml of methanol and the suspension is shaken under a hydrogen atmosphere after Raney-nickel has been added. The calculated amount of hydrogen is quickly absorbed. Subsequently the catalyst is separated by suction-filtration and the main amount of methanol is evaporated. After hydrolysis by means of an excess of sodium hydroxide solution of 45 percent strength, the sodium salt formed is dissolved in 500 ml of hot water. The pH of the solution is adjusted to 5-6 by means of glacial acetic acid and the product is then suction-filtered after standing overnight. 32 g of the above-mentioned compound having a melting point of 222°C are obtained.

After acylation with acetic anhydride or benzoic acid anhydride, the following compounds are obtained therefrom:

a. 4-(4'-acetylaminophenoxy)-phenoxy-acetic acid, m.p. 212°C

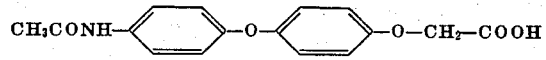

b. 4-(4'-benzoylaminophenoxy)-phenoxy-acetic acid, m.p. 221°C

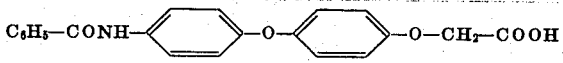

Preparation of the starting substances:
a. 4-(4'-methoxyphenoxy)-phenyl-diazonium fluoborate

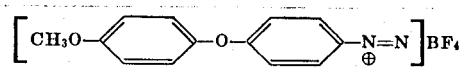

While stirring and cooling with ice, 108 g of 4-(4'-methoxy-phenoxy)-aniline are introduced into 800 ml of 2N-hydrochloric acid. A solution of 50 g of sodium nitrite is added dropwise to the suspension obtained so that a temperature of +10°C is not exceeded. When the reaction is complete, stirring is continued for another hour and then 400 ml of fluoboric acid of 40 percent strength are added dropwise thereto. The solution is evaporated in vacuo at 40°–50°C in a rotatory evaporator and diluted with water. The crystals obtained are suction-filtered and dried. The yield is 160 g.

b. 4-(4'-methoxyphenoxy)-fluorobenzene

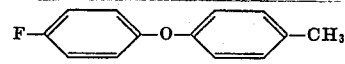

160 g of the above compound are slowly introduced while stirring into a flask preheated to 180°C. With the evolution of nitrogen and boron fluoride, 4-(4'-methoxyphenoxy)-fluorobenzene is formed. When the reaction is complete, the cooled reaction product is taken up in methylene chloride, shaken with a saturated sodium hydrogen carbonate solution and treated with water several times. After the organic solvent has been distilled off, the residue is distilled in vacuo. 63 g of the product having a boiling point of 143°C, under a pressure of 5 mm Hg, are obtained.

c. 4-(4'-fluorophenoxy)-phenol

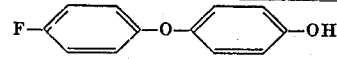

63 g of the above compound are added to a solution of 150 ml of hydrobromic acid of 60 percent strength and 300 ml of glacial acetic acid. The mixture is subsequently heated under reflux for 2 hours. After concentration in a rotatory evaporator, the phenol formed is precipitated by means of water. After crystallization from cyclohexane, 53 g of the above-mentioned compound having a melting point of 98°C are obtained.

d. 4-(4'-chlorophenoxy)-phenol

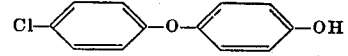

While cooling and stirring, 70 g of 4-(4'-hydroxyphenoxy)-aniline are introduced into 500 ml of 2N-hydrochloric acid.

At a temperature that does not exceed +10°C, 180 ml of a 2N-sodium nitrite solution are added dropwise thereto. The diazonium salt solution thus obtained is added to a boiling solution of 100 g of copper monochloride, 300 ml of concentrated hydrochloric acid and 300 ml of benzene. When the reaction is complete, the organic phase is separated and the whole is shaken several times with water. After evaporation of the benzene the residue is recrystallized from cyclohexane. 30 g of the product having a melting point of 82°C are obtained.

e. 4-(4'-bromophenoxy)-phenol

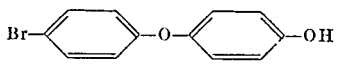

A solution of 202 g of 4,4'-dibromodiphenyl ether in 1,500 ml of methanol, 1,500 ml of water, 175 g of sodium hydroxide solution and 6 g of copper powder is heated to 210°C in an autoclave for 8 hours. After filtration, the methanol is evaporated in vacuo. Unreacted starting material is eliminated by shaking the whole several times with methylene chloride. After acidification of the aqueous solution with concentrated hydrochloric acid, the phenol is precipitated. The mixture is shaken with methylene chloride. The residue obtained after evaporation of the solvent from the methylene layer is stirred with benzene and suction-filtered. After evaporation of the benzene, 26 g of the above-mentioned compound having a melting point of 88°C are obtained.

f. 4-(4'-iodophenoxy)-phenol

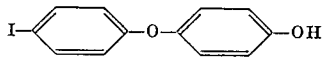

While cooling and stirring, 40 g of 4-(4'-hydroxyphenoxy)-aniline are introduced into a solution of 400 ml of glacial acetic acid, 100 ml of water and 20 ml of concentrated sulfuric acid. At a temperature that does not exceed +10°C, a solution of 14 g of sodium nitrite in 40 ml of water is slowly added dropwise to the solution obtained. When the reaction is complete, the stirring is continued for 30 minutes. Subsequently, this diazonium salt solution is run into a continuously shaken mixture of 300 ml of 1N-iodine, a solution of potassium iodide and 600 ml of chloroform. After 2 hours the excess of iodine is reduced by means of a sodium hydrogen sulfite solution. After the organic phase has been separated, the whole is shaken two times with water. After evaporation of the chloroform 52 g of a residue is obtained which is recrystallized from cyclohexane. 40 g of the above-mentioned compound having a melting point of 117°C are obtained.

g. 4-(4'-iodophenoxy)-anisol

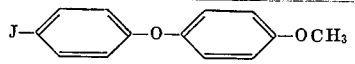

While cooling and stirring, 43 g of 4-(4'-methoxyphenoxy)-aniline are introduced into a solution of 200 ml of glacial acetic acid, 160 ml of 2N-hydrochloric acid and 20 ml of concentrated sulfuric acid. At 0°-3°C a solution of 16 g of sodium nitrite in 50 ml of water is added dropwise to this solution. After stirring has been continued for 1 hour this diazonium salt solution is slowly added to a carefully shaken mixture of 400 ml of 1N-iodine, a solution of potassium iodide and 500 ml of chloroform. After 2 hours the excess of iodine is reduced with a saturated sodium hydrogen sulfite solution. After the organic phase has been separated, the whole is shaken once more with water several times. The residue obtained after evaporation of the chloroform is recrystallized from cyclohexane. 40 g of the above-mentioned compound having a melting point of 121°C are obtained.

h. 4-(4'-methoxyphenoxy)-phenol

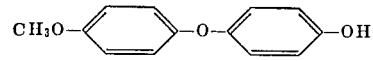

A mixture of 1,000 ml of water, 500 ml of methanol, 100 g of KOH, 15 g of copper powder and 254 g of 4-(4'-iodophenoxy)-anisol is heated, while stirring, to 180°-190°C for 4 hours in an autoclave. After filtration the main amount of the methanol is evaporated in vacuo. The unreacted iodide compound is separated by suction-filtration and the filtrate is acidified with concentrated hydrochloric acid. The 4-(4'-methoxyphenoxy)-phenol precipitates in crystals which are suction-filtered. After recrystallization from benzene 71 g of the compound having a melting point of 90°C are obtained.

We claim:

1. A phenoxy alkane-carboxylic acid of the formula

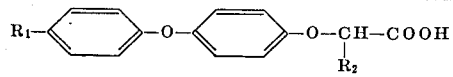

wherein $R_1$ is nitro, amino, lower alkanoylamino, phenyl-lower-alkanoylamino, lower alkoxy, or halogen, and $R_2$ is hydrogen or lower alkyl; esters of said phenoxy alkane-carboxylic acid with a saturated aliphatic alcohol having 1–4 carbon atoms, cyclopentanol, cyclohexanol, or a phenylalkyl alcohol; and pharmaceutically acceptable salts of said phenoxy alkane-carboxylic acid.

2. A compound as defined in claim 1 wherein $R_1$ is halogen and $R_2$ is hydrogen.

3. A compound as defined in claim 1 wherein $R_1$ is halogen and $R_2$ is alkyl with one or two carbon atoms.

4. A compound as defined in claim 1 wherein $R_1$ is fluorine and $R_2$ is hydrogen.

5. A compound as defined in claim 1 wherein $R_1$ is fluorine and $R_2$ is methyl.

6. A compound as defined in claim 1 wherein $R_1$ is chlorine and $R_2$ is hydrogen.

7. A compound as defined in claim 1 wherein $R_1$ is chlorine and $R_2$ is methyl.

8. A compound as defined in claim 1 wherein $R_1$ is bromine and $R_2$ is hydrogen.

9. A compound as defined in claim 1 wherein $R_1$ is bromine and $R_2$ is methyl.

10. A compound as defined in claim 1 wherein $R_1$ is iodine and $R_2$ is alkyl with one or two carbon atoms.

11. A compound as defined in claim 1 wherein $R_1$ is methoxy and $R_2$ is ethyl.

12. A compound of the formula

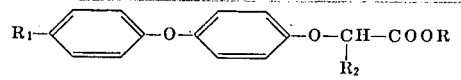

wherein $R_1$ and $R_2$ have the meaning of claim 1 and R is alkyl with one to four carbon atoms.

* * * * *